(No Model.)

J. S. NOWOTNY.
GALVANIC BATTERY.

No. 428,781. Patented May 27, 1890.

Witnesses:
John Holland
C. H. Paver

Inventor:
John S. Nowotny

UNITED STATES PATENT OFFICE.

JOHN S. NOWOTNY, OF CINCINNATI, OHIO, ASSIGNOR OF ONE-HALF TO JAMES J. WATROUS, OF SAME PLACE.

GALVANIC BATTERY.

SPECIFICATION forming part of Letters Patent No. 428,781, dated May 27, 1890.

Application filed November 2, 1889. Serial No. 329,082. (No model.)

*To all whom it may concern:*

Be it known that I, JOHN S. NOWOTNY, a citizen of the United States, residing at the city of Cincinnati, in the county of Hamilton and State of Ohio, have invented certain new and useful Improvements in Galvanic Batteries, of which the following is a specification.

The several features of my invention and the advantages resulting from their use, conjointly or otherwise, will be apparent from the following description and claims.

Figure 1:
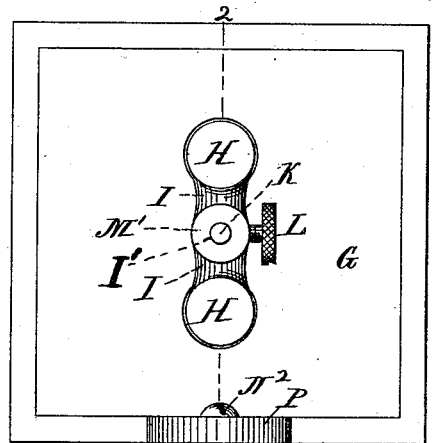
Figure 3:
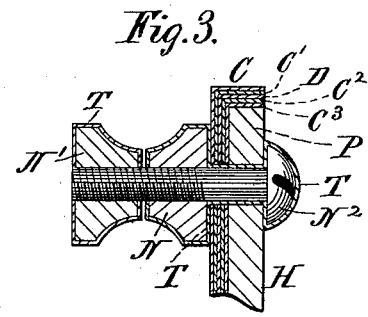
Figure 2:
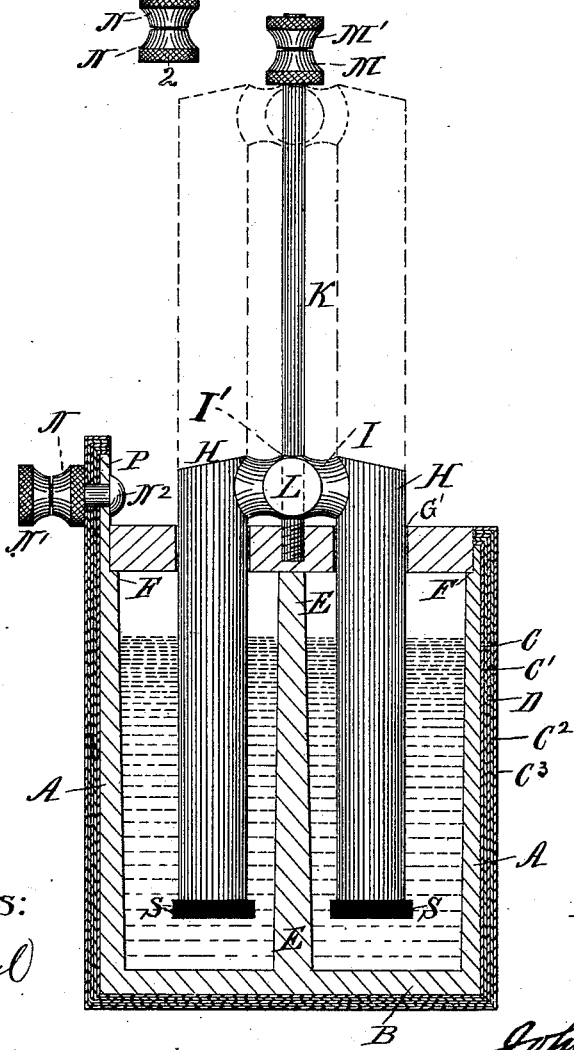

In the accompanying drawings, making a part of this specification, Figure 1 is a top view of a battery illustrating my invention. Fig. 2 is a vertical central section of the cells of said battery, taken at the dotted line 2 2 of Fig. 1, the zinc plates and the rod for their support when elevated and the adjustable contacts for connecting the wires to the respective poles of the battery being shown in elevation. Fig. 3 is a vertical central section of the adjustable contact for connecting the wire to the adjacent pole of the battery.

My invention is applicable to that class of batteries in which a metallic substance is used for one pole of the battery and in which carbon is employed for the other pole of the battery. The metallic pole of the battery being attacked by the liquid, heretofore it has been customary to employ a cell made of some non-conducting material—such as hard rubber or equivalent non-conducting electrical substance or earthenware or vitrified material—and it has been customary to place within this cell the materials which constitute the opposite poles of the battery and to surround the same by an acid solution or mixture placed within the said cell.

The first feature of my invention consists in employing carbon as the material for the cell. By such a use of the carbon, I am enabled to dispense with the ordinary cell made of earthenware or vitrified material or other electrical non-conducting materials. I am also enabled to dispense with the employment of independent separate movable pieces of carbon introduced into the cell. Furthermore, I am enabled to present in a very convenient manner an extensive surface of carbon to the action of the fluid within the cell. The surface of the carbon thus presented is much larger than that conveniently obtainable by the introduction of pieces or sheets of carbon within the space inclosed by the cell itself. I am also enabled to give more room for the admission of the large amount of surface of zinc or equivalent material to be acted upon by the liquid, acid, or mixture or solution within the cell itself. Furthermore, I am enabled to have opportunity for the presentation within the interior of the space of the cell itself of a larger amount of metallic surface than can be ordinarily the case where independent pieces of carbon are present and also independent separate pieces of metal. In constructing this cell I take the carbon and form it into the shape of the cell. This cell may be of any suitable configuration. This shape of the cell is, however, preferably rectangular, substantially as shown in the drawings.

In the drawings, A A A A respectively indicate the upright sides or walls of the cell, made of carbon. B represents the bottom of the cell, also made of carbon. The carbon being porous allows the liquid to percolate through it. In order to prevent the liquid within the cell from passing through the carbon, and in this way escaping from the cell, I coat the exterior of the cell with a suitable substance of a non-conducting character. The substances are of a kind that will stop up the outer ends of the pores or openings of the carbon, and thereby effectually prevent the escape through the carbon of the liquid within the cell. I have successfully used one or more coats of asphaltum applied to and baked to the outer surface of the carbon cells. Such successive coats are shown in the drawings, and are indicated by the letters C C' $C^2$ $C^3$.

Instead of the asphalt coat, a valuable and effective one is a vitrified one, consisting of a suitable glaze applied to the surface of the carbon in any of the well-known manners in which glaze is applied to other articles.

For the purpose of further utilizing the space within the cell, a partition or diaphragm E, of carbon, extending from one side of the cell to the other, from the top of the cell to the bottom, may be employed, and when desired, especially when the cell is a very large one, the number of such carbon partitions E may be increased. In practice I form the carbon cell by molding the carbon into a proper shape, and the preferred method of molding it is to force the carbon, of the consistency of baker's dough, into the molds under a hydraulic pressure of from forty to eighty tons. After the cell is withdrawn from the mold it is coated with asphaltum or other impervious material, substantially as hereinbefore specified.

When the battery-cell is intended for open-circuit work, the upright bar or rod that suspends the zincs may be dispensed with and the wires be connected directly to binding-posts on zinc, the zinc in this case remaining in the solution during the life of said battery. A suitable cover of non-conducting material is preferably provided for the cell. The preferred description of cover is one such as is shown in the drawings and indicated by the letter G. This cover is suitably supported. A convenient means of supporting it is as follows: The upper surface of the cell is provided with a projection or projections F, and the cover sets down within the upper edge of the cell and rests upon the projection or projections F. The adjacent walls of the cell thereby prevent any lateral displacement of the cover, and the projections F uphold the cover in its proper position at the upper part of the cell. The metal, preferably zinc, immersed in the liquid of the battery may be of any suitable form, but is preferably in the shape of cylinders. Two of such cylinders H are present and shown in the drawings, and for the purpose of obviating the disadvantages arising from a number of separate "contacts" the cylinders are united together at the top by a connecting arch or piece I, integral therewith. Where a central partition E is employed and the zincs are close to the partition, in order to prevent any danger of the zincs touching the said carbon partition, a rubber washer or band S may be employed, one rubber band or washer S being placed around the lower end of one of the cylinders H, and a corresponding rubber band or washer S being placed around the other of the cylinders or plates H.

Through the cover G holes G' are preferably provided, and through one of these holes passes one of the zinc cylinders H, and through the other of these holes passes the other zinc cylinder H. These openings G G' are sufficiently large to allow the metallic cylinders or plates H H to move up and down through them without friction and allow the polarizing gases to escape. It is desirable when the battery is not in use that the cylinders H H be out of contact with the liquid of the cell. While thus out of contact the process of corrosion of the metal ceases and the comparative strength of the liquid in the cell is undiminished. Thus the corrosion of valuable metal is obviated. The cell is, however, intended to be used in cases where the zincs are not removed from the cell, as well as in cases where they are at intervals lifted out of the solution.

An important feature of my invention consists in the means for holding the metallic plates or cylinders H out of contact with the liquid of the cell, and is as follows: An upright supporting-post K is suitably embedded or secured to the cell or the cover thereof. Preferably this post K is secured directly to the cover, and a convenient means of thus securing it is by means of the ordinary screw-thread on the bottom of the support engaging a screw-thread on the interior of the opening in the cover receiving the foot of the support K. This support K extends vertically above the cell to a height sufficient to enable the metallic cylinders or plates when elevated and attached to the said support to be out of contact with the liquid of the cell. Between the metallic cylinder or plate H and the upright support K, I provide an adjustable connection, whereby the cylinder H when raised up out of contact with the liquid in the cell may be attached to and supported by the support K, and when the cylinder H is to be lowered may be readily and quickly disengaged therefrom.

Through the connection or piece I an opening I' is formed, and through this opening the post K is passed. A set-screw L, located in the side of the connection I, is arranged to be screwed against the post K, or to be retracted therefrom. In practice, when it is desired to remove the metallic cylinder or plate H out of contact with the liquid of the cell, they are elevated out of the liquid, and the screw, being advanced, binds the cylinders H to the post and holds them securely elevated in the position shown by the dotted lines in Fig. 2 of the drawings.

In order to make perfect electrical contact between the metallic cylinders when lowered and in operation in the battery with the conducting-wire of the circuit, I provide the adjustable connection or contact M' M, the upper one M' of these members having a central opening provided with a screw engaging a corresponding screw-thread upon the upper end of the post K, the conducting-wire being placed between the upper and lower members M M' and coiled about the post K. The upper member M' is screwed down, thereby clamping the conducting-wire firmly between the members M M' of the contact or connection. The carbon of the cell must be connected to the opposite conducting-wire of the circuit. A preferred and novel mode of making such connection consists in providing adjustable connection or contact, consisting of two parts N N' and screw N², the head of this screw being located on one side of the wall of this carbon cell and the shank of the bolt passing through said wall, the member N of the contact being screwed on the shank of said screw, and thereby clamping the wall of the cell firmly between the head of the bolt and the member N. The outer end of the screw-threaded shank of the bolt $N^2$ extends beyond the member N, and upon this extension of said shank is screwed the other member N' of the contact. The end of one of the wires of the circuit being introduced between the members N N' and wound around the shank of the screw, the member N' is screwed up toward the member N and firmly clamps the end of the said wire between it and the member N. A portion of the wall of the cell is extended upward, as shown in Fig. 2 at P, and the contact N N' $N^2$ is attached thereto, substantially as shown.

It is a well-known fact that electrical action at the point of contact is such as to rapidly corrode the metal of said contacts. This corrosion extends over all of the exterior surfaces of the parts of the contacts, and thus in a comparatively short time a layer of corroded metal becomes present upon the surfaces of the adjacent parts of the contact. This corroded metal is a non-conductor, and its presence greatly prevents the admission of the electrical current through the contact, and thus the working power of a battery is always greatly impaired and is often destroyed. With a view of obviating this difficulty I have invented a new and exceedingly useful means of preventing the corrosion of electrical contacts. These means consist in interposing a metal known as "iridium" between the surfaces of the adjacent parts of the contacts. I effectually interpose this iridium between the said adjacent surfaces by electroplating the contacts with iridium. This coating is illustrated in exaggerated proportion in Fig. 3, and is indicated by the letter T. This coating of iridium is practically indestructible, non-corrosive, and will prevent the metals of the contacts from being corroded, especially where the current is interrupted or the circuit broken. Thus the removing from the contacts the layer of corrosive material formed by the action of the electrical current and of an acid is obviated. Furthermore, the gradual diminution of the working power of the battery by the insensible and gradual increasing corrosion of the contacts is prevented. Furthermore, the presence of an experienced electrician, accustomed to detect the corrosion and the consequent diminution in the working capacity of the battery, is rendered unnecessary.

I claim this application of the interposition of iridium between contacts of descriptions other than those herein specifically mentioned.

In addition to the advantages hereinbefore mentioned, resulting from the several features of my invention, it will be here remarked that the entire battery is one of great strength and perfection. The electro-motive force is high and constant. Its internal resistance is very low, and the battery is therefore very efficient. It is a battery which gives a constant current, and it is remarkably free from polarization. It is very inexpensive in use. The non-corrosive character of the contacts prevents any diminution or loss of the working power and consequent waste of materials. Furthermore, when employed as an open-circuit battery, it is very economical of material.

While the various features of my invention are preferably employed together, one or more of said features may be used without the remainder, and in so far as applicable one or more of said features may be used in connection with batteries of a description other than the one herein specifically described.

What I claim as new and of my invention, and desire to secure by Letters Patent, is—

1. A battery-cell composed of carbon and provided with interior partition or partitions of carbon integral with the sides of the cell, substantially as and for the purposes specified.

2. In a battery carbon cell having two or more compartments, the zincs united at the top by an arch integral therewith, one of the zincs being in one compartment of the battery and another of these zincs being in another of the said compartments, substantially as and for the purposes specified.

3. In a battery having two or more cells, the stationary supporting-posts K and zincs united by the arch I, through which passes the upright stationary post K, one of said zincs being located in one cell and the other zinc in the other cell, substantially as and for the purposes specified.

4. In a battery-cell, the stationary post K and the zincs united by the arch I, through which passes the stationary post K, the zincs sliding on the said post, and the set-screw L, substantially as and for the purposes specified.

5. In a battery-cell, the cover E and the stationary post K, rigidly connected thereto, and a zinc sliding on the said post, and set-screw L, substantially as and for the purposes specified.

6. The combination of the supporting-post K, provided at its upper end with a contact, as M M', and a zinc or zincs sliding thereon and adjusted by a set-screw, as L, substantially as and for the purposes specified.

7. The cell provided with the extension P and the stationary post K, and a zinc or zincs being capable of being fastened at any point thereon by set-screw L, and the upper end of post K being provided with a contact, all substantially as and for the purposes specified.

8. The outer cell of a battery composed of carbon and having a transverse carbon diaphragm, and the zincs H H, respectively located on opposite sides of said diaphragm, substantially as and for the purposes specified.

9. A battery-cell composed of carbon having a transverse carbon partition and the zincs H H, respectively located on opposite sides of the said partition and united together at the top by a connecting-arch or cross-piece I, integral therewith, substantially as and for the purposes specified.

10. Electrical contacts, substantially as described, electroplated with iridium, for the purposes specified.

11. A battery-cell composed of carbon provided with extension P, having a contact secured thereto electroplated with iridium, substantially as and for the purposes specified.

12. In a battery-cell composed of carbon, and a cover, and a vertical stationary post K, located therein, and zincs sliding on said post, the post K having contacts, as M M', screwed to said post, the zincs being located on the post K by a set-contact L between the post and the zincs, the carbon cell having a screw-contact N N', secured to the carbon of the cell, the contact M M', set-contact L, and screw-contact N N' being electroplated with iridium, substantially as and for the purposes specified.

JOHN S. NOWOTNY.

Attest:
  JOHN HOLLAND,
  G. A. W. PAVER.